United States Patent [19]

MacDonald

[11] Patent Number: 4,461,994
[45] Date of Patent: Jul. 24, 1984

[54] PERMANENT MAGNET INDUCTOR TACHOMETER

[75] Inventor: Daniel J. MacDonald, Brookfield, Wis.

[73] Assignee: Litton Industrial Products, Inc., Beverly Hills, Calif.

[21] Appl. No.: 359,701

[22] Filed: Mar. 19, 1982

[51] Int. Cl.³ .................. G01P 3/48; H02K 17/42
[52] U.S. Cl. ................................ 324/174; 310/168; 324/160
[58] Field of Search ............... 310/168, 171; 324/174, 324/160, 163, 166

[56] References Cited

U.S. PATENT DOCUMENTS

| | | | |
|---|---|---|---|
| 2,814,745 | 11/1957 | Sinclair | 310/168 |
| 3,408,556 | 10/1968 | Gabor | 310/168 UX |
| 3,619,678 | 11/1971 | Ruof | 310/168 X |
| 3,980,913 | 9/1976 | Peterson | 310/168 X |
| 4,424,463 | 1/1984 | Musil | |
| 4,425,522 | 1/1984 | Miyasaka | |

FOREIGN PATENT DOCUMENTS 813860 7/1949 Fed. Rep. of Germany ...... 310/168

OTHER PUBLICATIONS

Goretzki: "Slotted Probe to Achieve Multiple Cycles per Emitter Tooth"-IBM Bulletin-Feb. 71-p. 2579.
General Electric Type AN Generators-Specifications Sheets for Models AN100A, AN102D and AN102B, Nov. 1978.

*Primary Examiner*—Stanley T. Krawczewicz
*Assistant Examiner*—Jose M. Solis
*Attorney, Agent, or Firm*—John M. Haurykiewicz; Robert A. Seldon; Walter R. Thiel

[57] ABSTRACT

The tachometer of the present invention has a stator member with a pair of opposed stator elements. The stator member is mounted on the apparatus. Windings are provided on the stator elements in which the electric signal is generated.

A magnetic means is provided for establishing a magnetic flux between the stator segments. For this purpose, magnets may be mounted on the exterior of the stator segments and the portions of the apparatus adjacent the segments used as the flux return path. Or, magnets may bridge the two stator segments.

A magnetically permeable rotor is mounted on the apparatus shaft. The rotor may be formed of steel laminations with no rotating winding and has a plurality of peripheral projections that alter the reluctance of the magnetic path in the teeth as they rotate, inducing a speed responsive signal in the windings. The maximum speed of the rotor is limited only by the strength of the steel.

12 Claims, 7 Drawing Figures

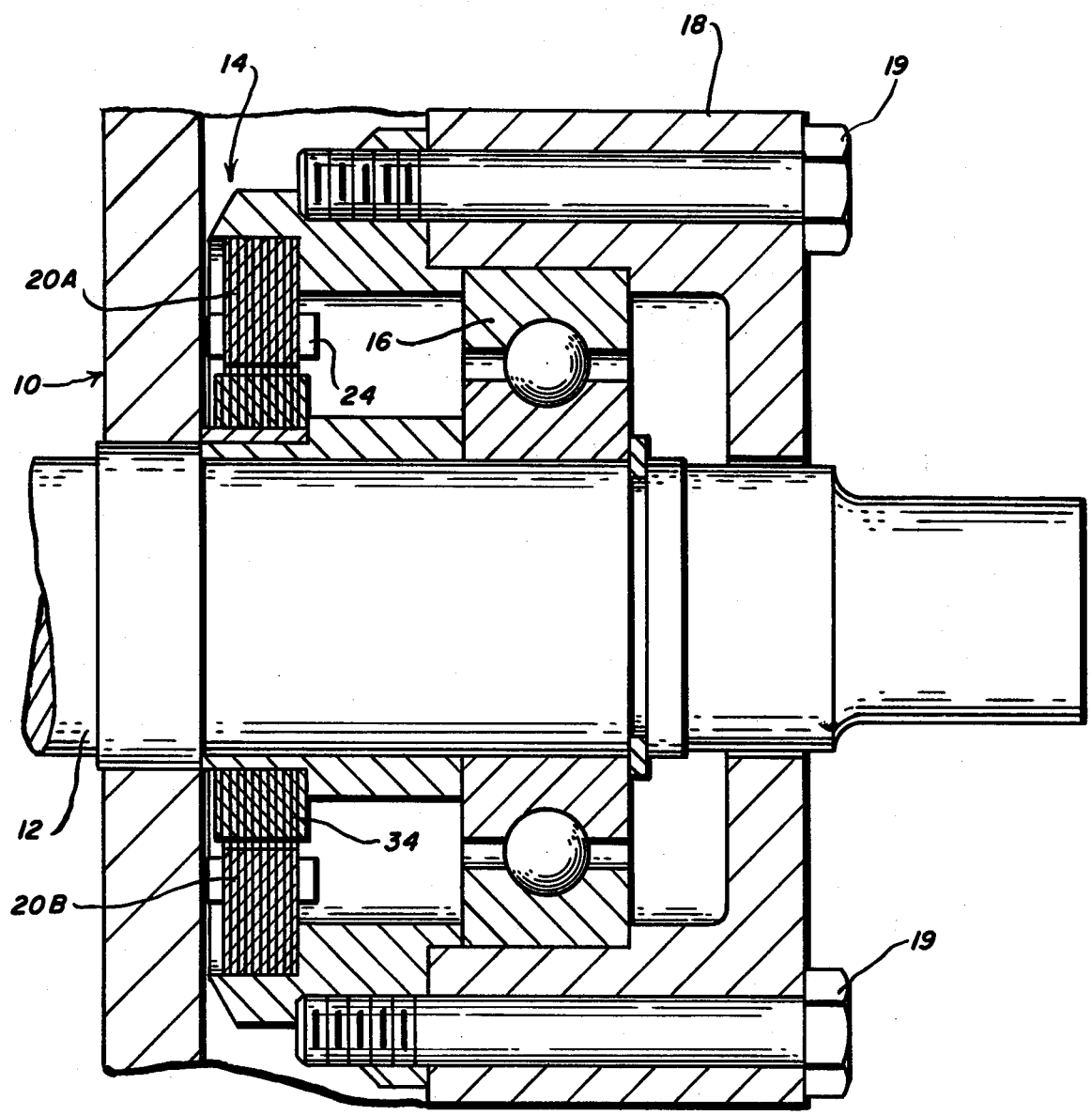
Fig_1

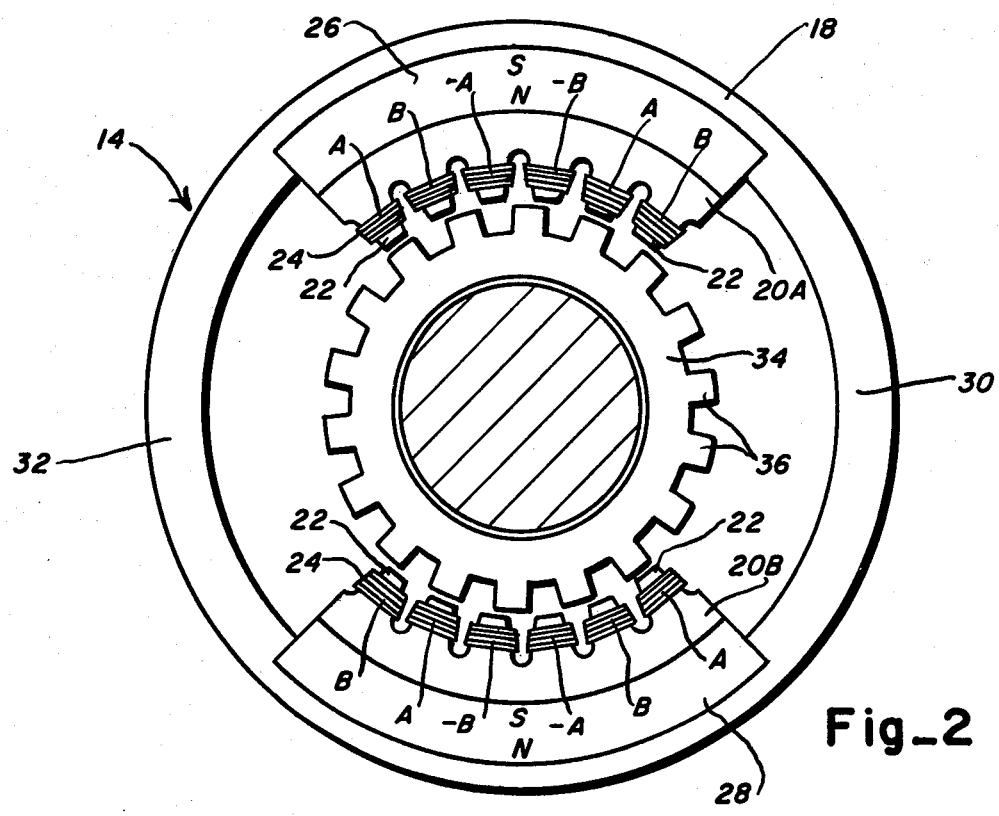
Fig_2
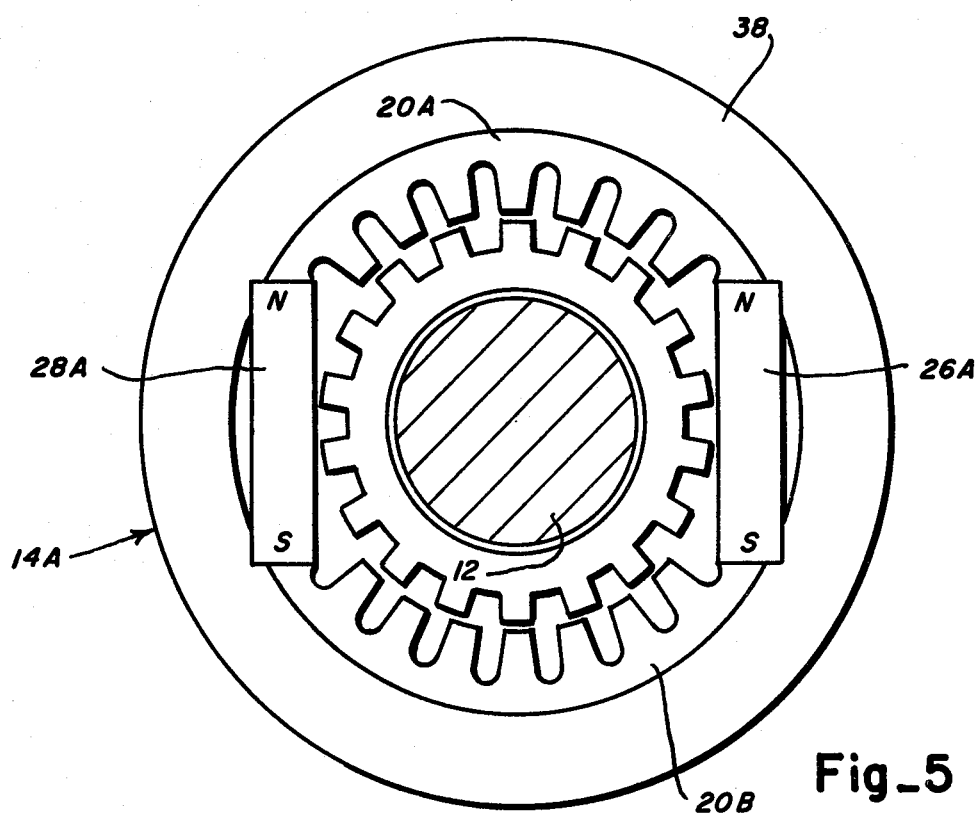
Fig_5

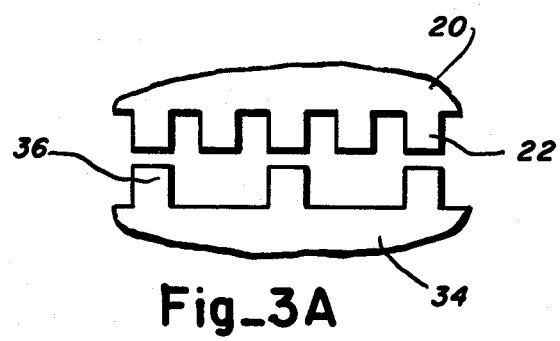
Fig_3A
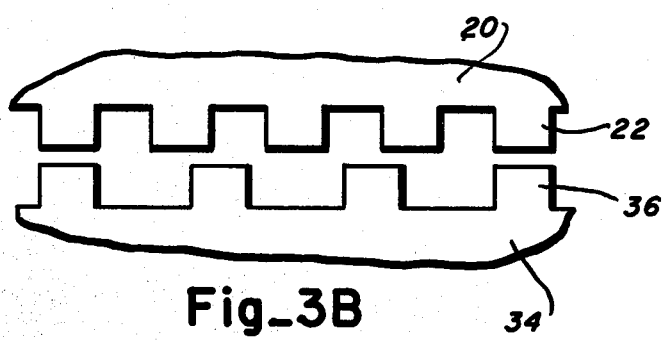
Fig_3B
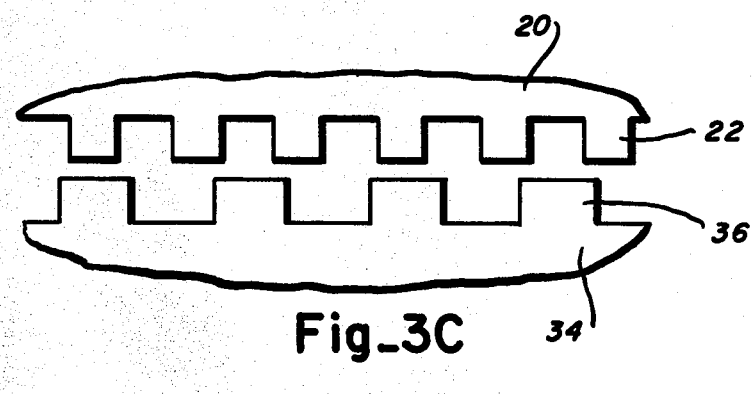
Fig_3C
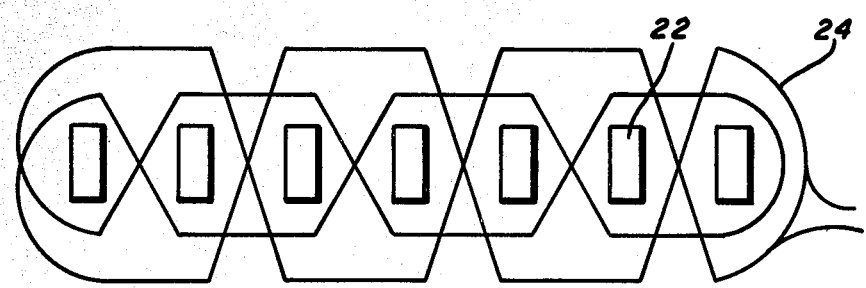
Fig_4

PERMANENT MAGNET INDUCTOR TACHOMETER

The present invention relates to an electrical tachometer suitable for measuring the speed of a rotating element. Such tachometers are often used with motors, slip couplings or other apparatus for providing an electrical signal proportional to the speed of the output shaft. The signal may be used for control or other purposes.

At present, such devices commonly have a rotor with magnetic poles mounted on the motor output shaft and embraced by a conventionally wound stator. When the rotor rotates in the stator winding, a signal proportional to shaft speed is generated in the stator winding by electro-dynamic generator action.

In many applications it is desirable to integrally mount the tachometer in the apparatus for protection, convenience, or for other reasons. The space available for the tachometer in the apparatus is usually limited because of the mechanical construction of the apparatus. Further, in certain applications, it is desired to place the tachometer inboard of the shaft bearing so that the tachometer does not detract from the belted load characteristics of the apparatus. This reduces the space available for the tachometer even more. The axial dimension available for the tachometer is often extremely limited.

When the size of a tach-generator of the type described above is reduced to that required for integral, inboard mounting, it becomes difficult to maintain enough rotor poles to keep the ripple frequency in the output signal sufficiently high as to be easily filterable. This adversely effects the quality of the output signal.

It is, therefore, the object of the present invention to provide an improved tachometer that may be constructed in a reduced size enabling incorporation within the confines of apparatus, such as motors and couplings without lessening the quality of the output signal.

These objects are achieved by providing a tachometer utilizing the principles of an induction generator rather than electro-dynamic generator action. This permits a reduction in the size and number of teeth in the rotor without increasing the ripple in the output signal. In certain applications, adjacent portions of the apparatus may be employed both as a flux return path in the stator element and as mechanical support for the tachometer, thereby reducing its size. The tachometer can be constructed with a small axial dimension, facilitating integral mounting. The tachometer operates with a high degree of stability and reliability over a wide range of operating conditions, including, particularly, high speed operation.

The tachometer of the present invention has a stator member with a pair of opposed stator elements. The stator member is mounted on the apparatus. Windings are provided on the stator elements in which the electric signal is generated.

A magnetic means is provided for establishing a magnetic flux between the stator segments. For this purpose, magnets may be mounted on the exterior of the stator segments and the portions of the apparatus adjacent the segments used as the flux return path. Or, magnets may bridge the two stator segments.

A magnetically permeable rotor is mounted on the apparatus shaft. The rotor may be formed of steel laminations with no rotating winding and has a plurality of peripheral projections that alter the reluctance of the magnetic path in the teeth as they rotate, inducing a speed responsive signal in the windings. The maximum speed of the rotor is limited only by the strength of the steel.

In the drawings:

FIG. 1 is a cross-sectional side view of the improved tachometer of the present invention.

FIG. 2 is a front view of one embodiment of the tachometer of the present invention;

FIGS. 3A, 3B, and 3C are schematic diagrams showing various stator tooth and rotor projection configurations;

FIG. 4 is a diagram showing a skein winding of the stator; and

FIG. 5 is a front view of a second embodiment of the tachometer of the present invention.

FIG. 1 shows apparatus 10, such as an eddy current slip coupling, having output shaft 12. Tachometer 14 is provided in apparatus 10 to measure the speed of the output shaft. As noted supra, it is desired to integrally mount tachometer 14 in apparatus 10 inboard of bearing 16. While this maintains the belted load capacity of apparatus 10, it also decreases the space available for tachometer 14. FIG. 1 shows tachometer 14 mounted on bearing cap 18 by bolts 19.

FIG. 2 shows the details of one embodiment of tachometer 14. Tachometer 14 includes a stator member mountable in apparatus 10. The stator member is comprised of a pair of diametrically opposed, arcuate stator segments 20A and 20B mounted in bearing cap 18 of apparatus 10. Stator segments 20A and 20B may be constructed of a high magnetic permeability material such as laminated silicon steel. Stator segments 20A and 20B contain a plurality of inwardly extending teeth 22. A winding 24 is mounted on stator segments 20A and 20B, as hereinafter described in detail.

An arcuate magnet is placed along the exterior of each of stator segments 20A and 20B. The polarity of magnet 26 placed along the exterior of stator segments 20A is opposite to the polarity of magnet 28 placed along the exterior of stator element 20B so that a magnetic flux extends diametrically between the two segments. Alnico magnetic material may be used for magnets 26 and 28 in view of its desirable temperature stability characteristics. Other materials, such as barium ferrite, are also usable.

A return path for the magnetic flux extends through sections 30 and 32 of bearing cap 18 positioned between stator segments 20A and 20B. Use of sections 30 and 32 of the bearing cap 18 both as a flux return path and as mechanical support for stator segments 20A and 20B permits a reduction in the size of tachometer 14. While use of bearing cap 18 is described above, it will be appreciated that another appropriate element of apparatus 10 may be used, if desired.

Tachometer 14 includes rotor member 34 shaped as an annulus and mounted on output shaft 12. Rotor 34 is also formed from a material of high magnetic permeability, such as iron or steel. The rotor may be of solid construction or of laminated construction, the latter reducing losses. Rotor 34 has a plurality of peripheral projections 36.

It is preferable to keep the total machine flux generally constant and unvarying and the relationship of stator teeth 22 and rotor projections 36 is arranged with this in mind. The relationship of the stator teeth to the rotor projections also depends on the number of phases desired in stator winding 24. FIGS. 3A, 3B, and 3C show teeth-projection configurations for single phase, two phase, and three phase windings, respectively, in which the stator teeth 22 have an electrical angle or pitch with respect to the stator projections 36 of 180°, 90°, and 120°, respectively.

Winding 24 for stator 20 may take several forms. The simplest form is an individual coil around each tooth 22, as shown in FIG. 2 which shows a two phase winding and the teeth-projection configuration of FIG. 3B. The two phases are identified as A and B and the windings in each phase are connected in series to provide the output signal of tachometer 14. The output in phase A winding will be 90° out of phase with that of the phase B winding.

For a single phase output, various "skein" windings may be used. A skein winding is interleaved through several slots as diagrammatically and exemplarily shown in FIG. 4 for one of stator segments 20A or 20B.

Windings 24 may be encapsulated in a resin or other protective material, if desired.

In operation, as output shaft 12 revolves, rotor 34 rotates in the flux extending between stator segments 20A and 20B. As a rotor projection 36 travels past a stator tooth 22, the reluctance of the magnetic circuit through the stator tooth changes. When rotor projection 36 is aligned with stator tooth 22, a low reluctance path is established. When the stator and rotor teeth are out of alignment, the reluctance of the magnetic circuit through the stator tooth is increased.

Changes in the reluctance of the magnetic circuit changes the flux linkage in the winding 24 around the stator tooth. The change in flux induces a voltage in winding 24. The magnitude of the induced voltage will be proportional to the rate of change of the flux, which is dependent on the rotational speed of rotor 34.

Thus, the voltage induced in winding 24 is an indication of the speed of shaft 12. The frequency of the voltage will also be proportional to the speed of shaft 12. This permits tachometer 14 to be used in either an analog or a digital mode.

FIG. 5 shows a modified tachometer 14a. Magnets 26A and 28A may be placed at the sides of stator segments 20A and 20B to complete the magnetic circuit in the stator. This avoids the need to use portions 30 and 32 of bearing cap 18 for this purpose. Tachometer 14A is contained in a housing 38 of aluminum or other nonmagnetic material to contain the fields of magnets 26A and 28A. Housing 38 also isolates tachometer 14 from magnetic fields existing in apparatus, such as eddy current clutches. The stator segments are located at the ends of the magnets. Magnets 26A and 28A may be arcuately shaped, if desired.

Various modes of carrying out the invention are contemplated as being within the scope of the following claims particularly pointing out and distinctly claiming the subject matter which is regared as the invention.

I claim:

1. In a mechanical apparatus having an output shaft supported by an output bearing for driving belted loads, the improvement in combination therewith of a tachometer located inboard of the output bearing for maintaining the belted load capacity of the apparatus and adapted to provide an electric signal indicative of the rotary speed of the output shaft, the tachometer comprising:
   (a) a rotor mounted inboard of said bearing on said shaft for rotation therewith and having a plurality of projections protruding along the rotor periphery; and
   (b) a stator assembly mounted inboard of said bearing and having:
      (i) a plurality of opposed stator segments, each having stator teeth,
      (ii) windings on said stator teeth for providing the electric speed signal,
      (iii) flux establishing means for establishing magnetic flux in said stator segments, and
      (iv) flux return path means connecting said stator segments exterior of said rotor for providing a magnetic flux return path between said stator segments in the stator;

wherein said rotor projections and said stator teeth form a plurality of flux transmission paths whose magnetic flux varies in response to rotation of said shaft; and wherein said flux return path means receives substantially all the flux from said flux transmission paths so that the total machine flux in said return path is substantially constant.

2. The tachometer according to claim 1 wherein said magnetic flux establishing means comprises permanent magnet means.

3. The tachometer according to claim 2 wherein said magnetic flux establishing means further comprises a magnet mounted on the exterior of each stator segment.

4. The tachometer according to claim 3 wherein at least a portion of the apparatus is formed of a ferromagnetic material and wherein said magnetic flux return means comprises ferromagnetic portions of said apparatus adjacent to said stator segments.

5. The tachometer according to claim 2 wherein said apparatus portion comprises a bearing cap for said output bearing and said magnetic flux return path means comprises ferromagnetic portions of said bearing cap.

6. The tachometer according to claim 5 wherein said magnetic flux establishing means comprises magnets bridging said opposed stator segments.

7. The tachometer according to claim 1 wherein said rotor is of solid construction.

8. The tachometer according to claim 1 wherein said rotor is of laminated construction.

9. The tachometer according to claim 1 wherein said windings are so formed as to provide a single phase output signal.

10. The tachometer according to claim 1 wherein said windings are so formed as to provide a plural phase output signal.

11. The tachometer according to claim 1 wherein said windings comprise a plurality of coils wound around said stator teeth.

12. The tachometer according to claim 1 wherein said windings comprise a plurality of loops in a skein winding.

* * * * *